United States Patent
Ohsumi

(10) Patent No.: US 10,589,696 B2
(45) Date of Patent: *Mar. 17, 2020

(54) ON-VEHICLE IMAGE PROCESSING DEVICE

(71) Applicant: Hitachi Automotive Systems, Ltd., Hitachinaka-shi, Ibaraki (JP)

(72) Inventor: Ken Ohsumi, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/234,182

(22) Filed: Dec. 27, 2018

(65) Prior Publication Data

US 2019/0202374 A1 Jul. 4, 2019

Related U.S. Application Data

(63) Continuation of application No. 14/418,145, filed as application No. PCT/JP2013/066772 on Jun. 19, 2013, now Pat. No. 10,214,155.

(30) Foreign Application Priority Data

Jul. 31, 2012 (JP) ................................. 2012-169073

(51) Int. Cl.
*B60R 11/04* (2006.01)
*G01C 3/18* (2006.01)
(Continued)

(52) U.S. Cl.
CPC ................ *B60R 11/04* (2013.01); *B60R 1/00* (2013.01); *G01C 3/18* (2013.01); *G03B 17/02* (2013.01);
(Continued)

(58) Field of Classification Search
CPC ........... H04N 5/225; B60R 11/04; B60R 1/00; G01C 3/18; G03B 17/02; G03B 17/361; G03B 35/008
See application file for complete search history.

(56) References Cited

U.S. PATENT DOCUMENTS 6,803,961 B1 10/2004 Ezawa et al.
6,811,330 B1 11/2004 Tozawa
(Continued)

FOREIGN PATENT DOCUMENTS

JP 2001-51966 A 2/2001
JP 2001-242521 A 9/2001
(Continued)

OTHER PUBLICATIONS

English Translation of Japanese-language Office Action issued in counterpart Japanese Application No. 2015-156594 dated Jul. 27, 2016 (four (4) pages).
(Continued)

*Primary Examiner* — Antoinette T Spinks
(74) *Attorney, Agent, or Firm* — Crowell & Moring LLP

(57) ABSTRACT

An object of the present invention is to provide is an on-vehicle image processing device that achieves low cost and provides high mounting accuracy and high electrical adjustment accuracy during a manufacturing process. The on-vehicle image processing device includes a first imaging section, a second imaging section, and an enclosure having the first imaging section at one end and the second imaging section at the other end. The on-vehicle image processing device generates a range image from images captured by the first and second imaging sections. The on-vehicle image processing device further includes an enclosure reference surface that comes in contact with an equipment jig during manufacture, the enclosure reference surface being provided
(Continued)

at two locations between the first and second imaging sections.

8 Claims, 3 Drawing Sheets

(51) Int. Cl.
*G03B 17/02* (2006.01)
*G03B 17/56* (2006.01)
*G03B 35/08* (2006.01)
*B60R 1/00* (2006.01)
*H04N 5/225* (2006.01)

(52) U.S. Cl.
CPC .......... *G03B 17/561* (2013.01); *G03B 35/08* (2013.01); *H04N 5/2253* (2013.01)

(56) References Cited

U.S. PATENT DOCUMENTS

| | | |
|---|---|---|
| 8,077,295 B2 | 12/2011 | Inagaki et al. |
| 2005/0140818 A1 | 6/2005 | Uemura et al. |
| 2006/0227236 A1 | 10/2006 | Pak |
| 2007/0109527 A1 | 5/2007 | Wenstrand |
| 2008/0001727 A1 | 1/2008 | Ohsumi et al. |
| 2009/0135246 A1 | 5/2009 | Uchiyama et al. |
| 2009/0268013 A1 | 10/2009 | Katahira et al. |
| 2010/0128245 A1 | 5/2010 | Inagaki et al. |
| 2011/0050855 A1 | 3/2011 | Nobis et al. |
| 2012/0081550 A1 | 4/2012 | Sewell |
| 2012/0086784 A1 | 4/2012 | Oh et al. |
| 2014/0247390 A1 | 9/2014 | Ohsumi |

FOREIGN PATENT DOCUMENTS

| | | |
|---|---|---|
| JP | 2002-218504 A | 8/2002 |
| JP | 2007-225543 A | 9/2007 |
| JP | 2008-70774 A | 3/2008 |
| JP | 2009-68906 A | 4/2009 |
| JP | 2009-265412 A | 11/2009 |
| JP | 2010-106919 A | 5/2010 |
| JP | 2011-123078 A | 6/2011 |
| JP | 2012-189324 A | 10/2012 |

OTHER PUBLICATIONS

International Search Report (PCT/ISA/210) dated Aug. 6, 2013, with English translation (Four (4) pages).

Japanese-language Office Action issued in counterpart Japanese Application No. 2012-169073 dated Mar. 3, 2015 with English translation (Six (6) pages).

English translation of Japanese-language Office Action issued in counterpart Japanese Application No. 2015-156594 dated Feb. 14, 2017 (Four (4) pages).

English translation of German Office Action issued in counterpart German Application No. 11 2013 003 795.5 dated Apr. 24, 2017 (three pages).

English-language translation of Japanese Office Action issued in counterpart Japanese Application No. 2017-109654 dated May 8, 2018 (three (3) pages).

English translation of Japanese-language Office Action issued in counterpart Japanese Application No. 2017-109654 dated Jul. 11, 2018 (three (3) pages).

Japanese-language Office Action issued in counterpart Japanese Application No. 2018-200511 dated Aug. 23, 2019 with English translation (four (4) pages).

ON-VEHICLE IMAGE PROCESSING DEVICE

CROSS REFERENCE TO RELATED APPLICATIONS

This application is a continuation of U.S. application Ser. No. 14/418,145 filed Jan. 29, 2015, which is a National Stage of PCT International Application No. PCT/JP2013/066772, filed Jun. 19, 2013, which claims priority from Japanese Patent Application No. 2012-169073, filed on Jul. 31, 2012, the disclosures of which are expressly incorporated by reference herein.

TECHNICAL FIELD

The present invention relates to an on-vehicle image processing device having an image sensor.

BACKGROUND ART

An on-vehicle camera (hereinafter referred to as the stereo camera), serving as an on-vehicle image processing device, uses a pair of images captured by two imaging sections, calculates the distance to a target by triangulation, and recognizes the target accordingly, is now beginning to be applied to an on-vehicle system for facilitating safe driving of a vehicle.

In an environment where the device is mounted on vehicles, in particular, it is necessary to properly measure the distance to a remote target and recognize it due to application requirements that demand the detection of preceding vehicles, humans, and obstacles in order to take safety precautions.

Further, when a stereo image processing system is to be used as an on-vehicle system, it is also requested that the system be compact, low-priced, and highly reliable.

The above system generally includes a dedicated LSI that checks pixel information included in a pair of images, identifies positions of pixels indicative of feature points common to the pair of images, and determines the number of displaced pixels indicative of feature points in the pair of images (hereinafter referred to as disparity).

As the above principles apply, it is ideal that no displacement except disparity is found in the pair of images. All imaging means need to be structured so that they can be accurately adjusted to avoid any discrepancies in optical characteristics and signal characteristics and maintained in the accurately adjusted state.

An invention disclosed in Patent Document 1 is related to the above-described background art. Patent Document 1 describes that an on-vehicle camera formed of a pair of cameras includes a camera stay and an installation area. The installation area is structured integrally with the camera stay and fastened to a chassis of a vehicle, the camera stay holding the pair of cameras in predetermined positions. The on-vehicle camera is securely screwed into the installation holes in the chassis of the vehicle by use of three installation holes disposed in the installation area and of three screws. As the camera is screwed in this way, it is possible to accurately maintain the relative positions of the pair of cameras.

Patent Document 2 describes a compound-eye camera. Two or more light rays are emitted from two or more light sources disposed at a position at which the compound-eye camera is mounted. A target is disposed at an intersection of the two or more light sources. The compound-eye camera is adjusted by photographing the target. This adjustment makes it possible to accurately adjust the optical axis and focus of the compound-eye camera.

PRIOR ART LITERATURE

Patent Documents

Patent Document 1: JP-2009-68906-A
Patent Document 2: JP-2002-218504-A

SUMMARY OF THE INVENTION

Problems to be Solved by the Invention

To improve the measurement accuracy of a stereo camera, it is necessary to increase the accuracy of the relative positions of left and right imaging sections as mentioned above. However, simply increasing the mechanical accuracy of the enclosure will not result in adequate performance of the stereo camera. Therefore, electrical adjustments need to be made (corrections need to be made with images captured by the stereo camera) during a manufacturing process.

As such being the case, the stereo camera needs to be adjusted while it is mounted on a manufacturing equipment jig with higher accuracy than that when the stereo camera is mounted on a vehicle during the manufacturing process.

An idea described in Patent Document 1 is for mounting the stereo camera on a vehicle with high accuracy and making the enclosure unlikely to deform due to temperature changes. However, this idea is not adequate to provide high mounting accuracy for stereo camera adjustment during a manufacturing process. Further, Patent Document 2 states that the compound-eye camera is accurately mounted on a reference surface of a jig. However, Patent Document 2 does not describe in detail a method of accurately mounting the compound-eye camera.

In view of the above circumstances, the present invention has an object to provide an on-vehicle image processing device that achieves low cost and provides high mounting accuracy with respect to a manufacturing equipment jig in order to increase the accuracy of electrical adjustments during a manufacturing process.

Means for Solving the Problems

In order to solve the above problems, the on-vehicle image processing device according to the present invention includes a first imaging section, a second imaging section, and an enclosure having the first imaging section at one end and the second imaging section at the other end. The on-vehicle image processing device generates a range image from images captured by the first and second imaging sections. The on-vehicle image processing device further includes an enclosure reference surface that comes in contact with an equipment jig during manufacture, the enclosure reference surface being provided at two locations between the first and second imaging sections.

Effect of the Invention

The present invention provides an on-vehicle image processing device that achieves low cost and provides high mounting accuracy on a manufacturing equipment jig in order to increase the accuracy of electrical adjustments during a manufacturing process.

MODE FOR CARRYING OUT THE INVENTION

Embodiments of the present invention will now be described with reference to the accompanying drawings.

First Embodiment

Figure 1:
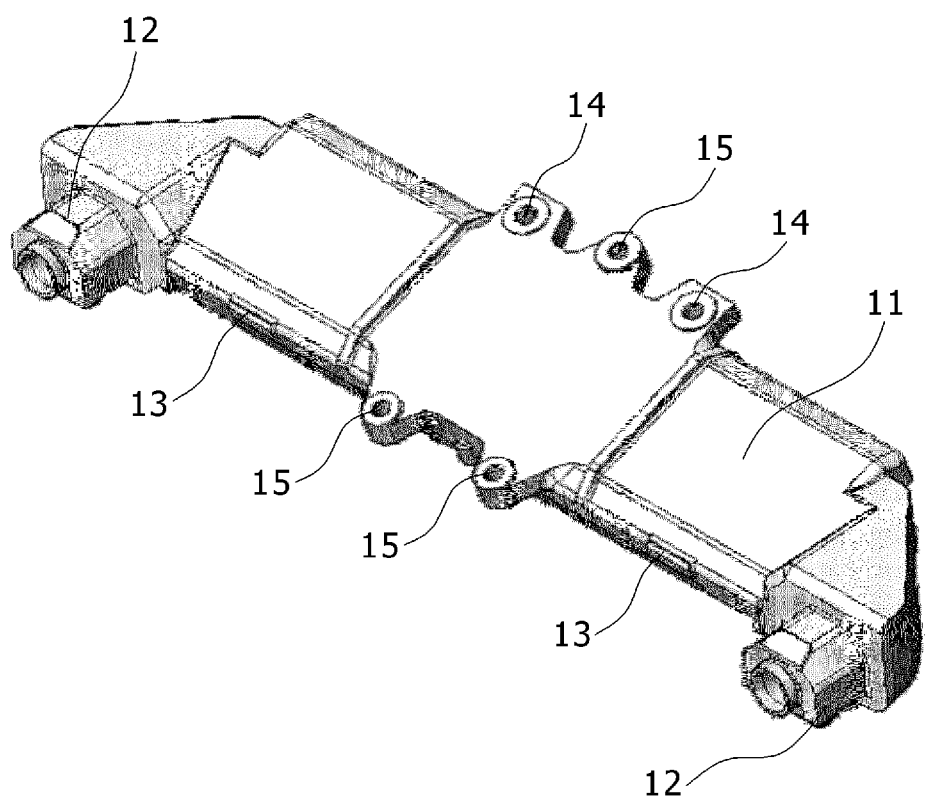
FIG. 1 is a diagram illustrating an exemplary enclosure structure of an on-vehicle image processing device according to a first embodiment of the present invention.

An embodiment of an on-vehicle image processing device according to the present invention will be described below. FIG. 1 shows an exemplary enclosure structure of a stereo camera that serves as an on-vehicle image processing device. The exemplary enclosure structure shown in FIG. 1 has an enclosure reference surface 13 that comes into contact with an equipment jig during manufacture.

As shown in FIG. 1, the stereo camera, serving as the on-vehicle image processing device according to the present invention, includes two imaging sections 12 (first and second imaging sections) and an enclosure 11. The enclosure 11 has the first imaging section at one end and the second imaging section at the other end. A range image (disparity image) is generated from images captured by these two imaging sections.

The imaging sections 12 each include an image sensor, a lens, left and right imaging circuit boards, and a signal processing circuit board. The lens causes the image sensor to form an image representing the visual information about the outside world. The imaging circuit boards have a processing function of introducing, into an image processing LSI, image information formed on the image sensor. The signal processing circuit board drives the image sensor.

The enclosure 11 includes a processing circuit board, a vehicle-mounting surface 15, a reference hole 14, and an enclosure reference surface 13. The processing circuit board includes a circuit that causes the image processing LSI to extract a target in accordance with the image information sent from the imaging circuit boards and calculates the distance to and the size of the target. The vehicle-mounting surface 15 has a base and holes into which screws are introduced for fixing the enclosure to a vehicle. The reference hole 14 engages with a pin on the vehicle to ensure that the stereo camera, serving as the on-vehicle image processing device, is accurately oriented when it is mounted on the vehicle. The enclosure reference surface 13 comes into contact with an equipment jig when the stereo camera is manufactured.

After the stereo camera is mounted on the equipment jig, the image of a random pattern needs to be captured for electrical adjustments of the stereo camera. To generate accurate adjustment data from the pattern, the imaging direction (hereinafter referred to as the optical axis) of the stereo camera needs to be fixed in a desired direction by causing the up-down, left-right, and front-rear positions of the enclosure reference surface 13 to coincide with desired positions when it is mounted on the equipment jig.

Further, the orientation of the optical axis in manufacturing equipment is most likely to be affected by displacement in the rotating direction of the up-down, left-right, and front-rear axes, the displacement arising when the stereo camera is mounted on the equipment jig. Therefore, such displacement needs to be minimized.

In a case where a plurality of reference holes 14 for mounting vehicles are used to mount the stereo camera on the equipment jig during manufacture, the intervals between the plurality of reference holes 14 for vehicle-mounting would be short because the plurality of reference holes 14 for vehicle-mounting are generally centered on the center of the enclosure 11. Accordingly, a larger mounting error would occur if the stereo camera is mounted on the equipment.

The present invention is characterized in that two enclosure reference surfaces 13 are provided between the first and second imaging sections and brought into contact with the equipment jig during manufacture. More specifically, the enclosure reference surface 13 is disposed between the first imaging section on one hand and the middle of the first and second imaging sections (or the vehicle-mounting surface 15) on the other as well as disposed between the second imaging section and the middle (or the vehicle-mounting surface 15). In other words, two enclosure reference surfaces 13 are provided on the enclosure 11 or the imaging sections 12 in addition to the plurality of reference holes 14 for vehicle-mounting, as shown in FIG. 1. The interval between the two enclosure reference surfaces 13 is maximized, or more specifically, the two enclosure reference surfaces 13 are positioned relatively close to the imaging sections (a first enclosure reference surface is positioned near the middle of the first imaging section and the vehicle-mounting surface but closer to the first imaging section, and a second enclosure reference surface is positioned near the middle of the second imaging section and the vehicle-mounting surface but closer to the second imaging section), so that the mounting error will be reduced to ⅓, the mounting error conventionally occurring at a rate of ½ when the stereo camera is mounted on the equipment. It is preferred that the interval between the two enclosure reference surfaces 13 be maximized by disposing them at the maximum possible distance from each other in the longitudinal direction of the enclosure 11. It is preferable that the two enclosure reference surfaces 13 be positioned near the lenses of the imaging sections 12, for example.

With reference to FIG. 1, the enclosure reference surfaces 13 are positioned at the front side—that is, toward the imaging direction of the imaging sections 12 of the enclosure 11.

In order to minimize the mounting error, it is preferred that the two enclosure reference surfaces 13 be positioned outward of the lenses of the imaging sections 12. However, the imaging sections 12 have to be mechanically adjusted, for instance, by adjusting the focus of each lens. Therefore, it is most appropriate that the two enclosure reference surfaces 13 be positioned as outward as possible within the limits of the enclosure 11.

When the contact with the equipment jig is taken into consideration, it is preferred that the enclosure reference surface 13 be rectangular in shape as shown in FIG. 1.

It should be noted, however, that the enclosure reference surface 13 can be used not only as the contact with an equipment jig for adjustment but also as the contact with a jig for processing.

Further, as the enclosure 11 is generally made of aluminum die cast, the enclosure reference surface 13 may also serve as an extrusion pin position for removing the enclosure from a die cast mold.

In the above cases, the enclosure reference surface 13 may be circular in shape as well.

The enclosure reference surface 13 that is to be processed and removed from a mold may be used as is, so that the enclosure reference surface 13 is as parallel a surface as possible. However, the degree of parallelism of the enclosure reference surface 13 can be increased by cutting or grinding.

The stereo camera needs to be properly positioned when it is mounted. Therefore, as shown in FIG. 1, the enclosure reference surface 13 needs to be big enough to come into contact with the equipment jig at two or more points.

In the above instance, only one enclosure reference surface 13 may suffice. However, as the enclosure reference surface 13 needs to be processed, it is preferred that the size of the enclosure reference surface 13 be minimized to reduce the cost.

Consequently, it is preferred that two or more enclosure reference surfaces 13 be provided and minimized in size.

When two enclosure reference surfaces 13 are to be provided and accurately mounted on the equipment, it is most appropriate that they be parallel and flush with each other. If the enclosure is shaped so that they cannot be flush with each other, they may be merely parallel to each other.

Second Embodiment

A second embodiment of the present invention will now be described with reference to an exemplary structure in which a certain enclosure reference surface is provided in addition to the enclosure reference surface 13 shown in FIG. 1. The second embodiment applies to a case where the surface brought into contact with the equipment jig during manufacture is positioned upward (on the surface to be mounted on the vehicle).

Elements that perform the same functions and are designated by the same reference numerals as the elements shown in FIG. 1 will not be redundantly described.

Figure 2A:
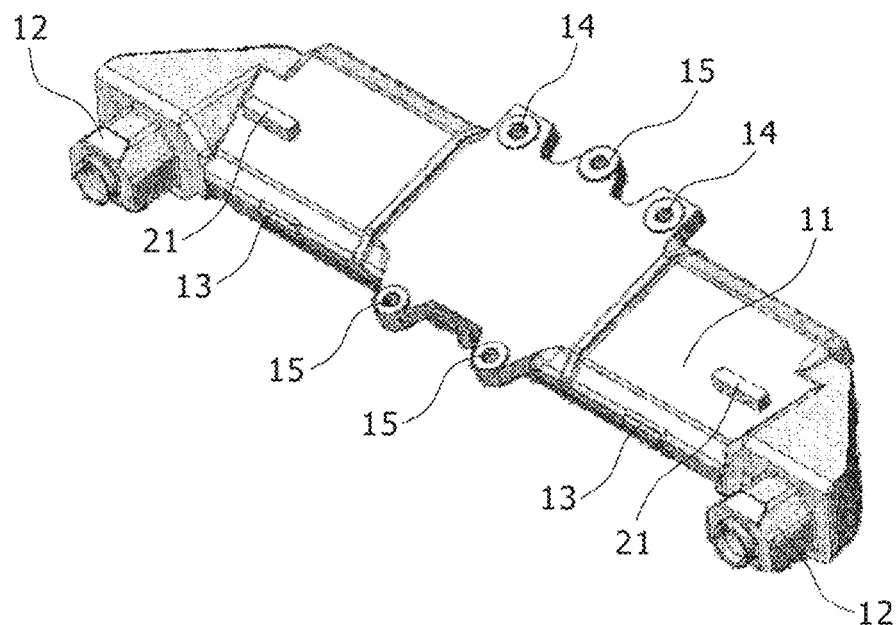
FIGS. 2A and 2B are diagrams illustrating an exemplary enclosure structure of the on-vehicle image processing device according to a second embodiment of the present invention.

FIG. 2A shows an example in which an upper enclosure reference surface 21 is disposed on the top of the enclosure 11 (on the surface to be mounted on the vehicle), that is, toward the vehicle-mounting surface 15, in addition to the enclosure reference surface 13.

Figure 2B:
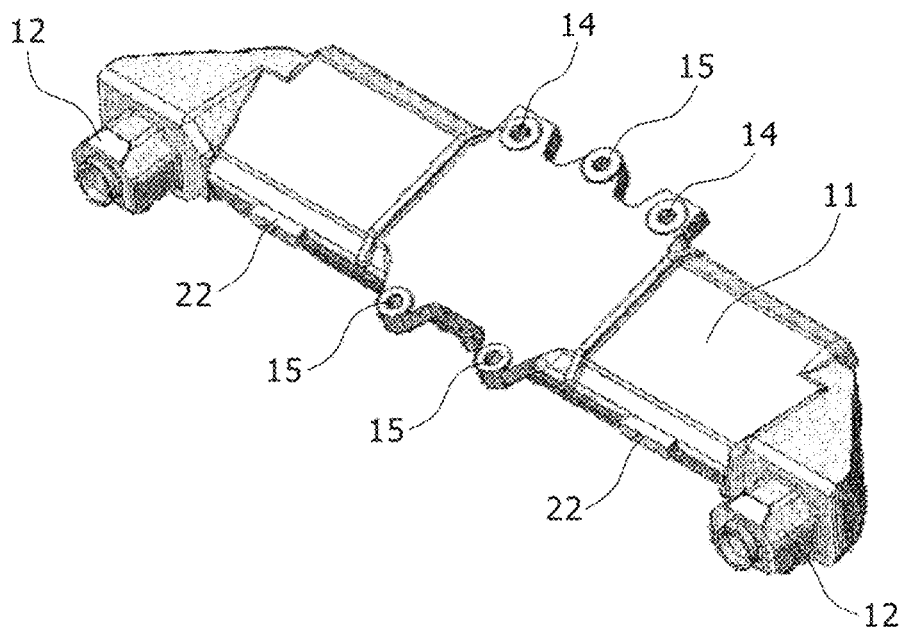

FIG. 2B shows an example in which a front enclosure reference surface 22, which is an integrated combination of the enclosure reference surface 13 and the upper enclosure reference surface 21, is provided. In this case, the surface brought into contact with the equipment jig during manufacture is disposed on the top of the front enclosure reference surface 22 (on the surface to be mounted on the vehicle), namely on the top of a front portion of the enclosure 11 in a direction in which the imaging sections 12 form an image.

Figure 3:
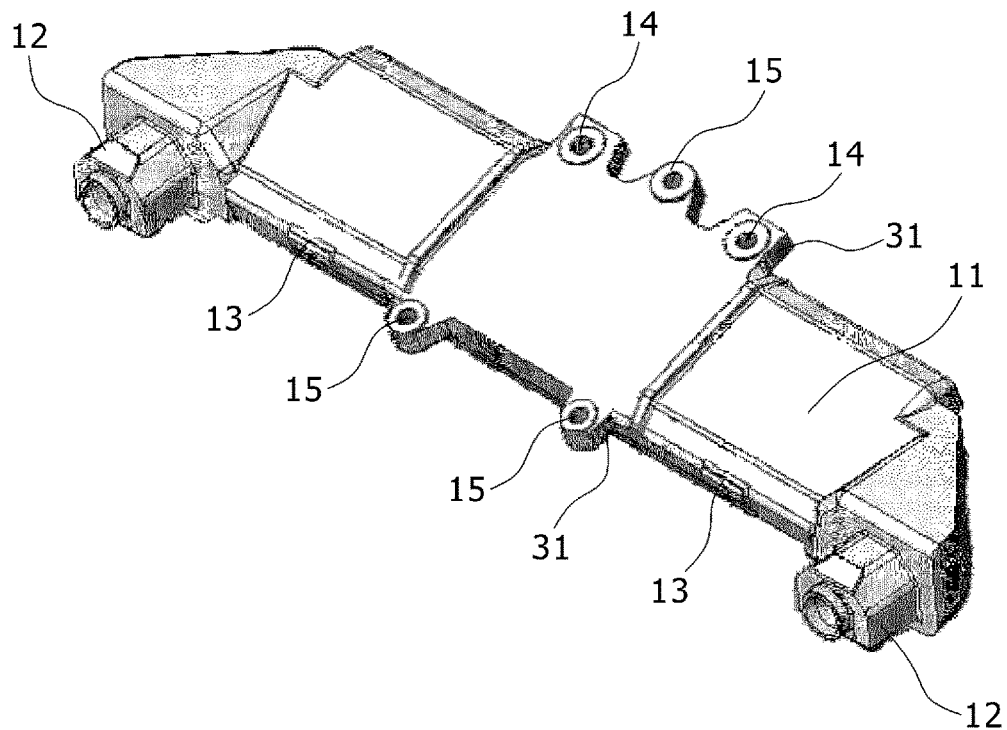
FIG. 3 is a diagram illustrating another exemplary enclosure structure of the on-vehicle image processing device according to the second embodiment.

FIG. 3 shows an example in which a lateral enclosure reference surface 31 is provided in addition to the enclosure reference surface 13. The lateral enclosure reference surface 31 is disposed on a lateral side of the reference hole 14, which is provided on the middle of the enclosure 11, and on a lateral side of the vehicle-mounting surface 15. More specifically, the lateral enclosure reference surface 31, which is provided on the middle, is disposed on a lateral side of one of two vehicle-mounting surfaces 15 that are disposed toward the imaging direction of the imaging sections 12, and is disposed on a lateral side of the other vehicle-mounting surface 15 that is disposed toward a direction opposite to the imaging direction.

As is the case with the enclosure reference surface 13, the upper enclosure reference surface 21 may also use the vehicle-mounting surface 15 that comes into contact with the vehicle at times of vehicle-mounting. However, the surface brought into contact with the vehicle is centered on the middle of the enclosure 11, as is the case with the enclosure reference surface 13. Therefore, in order to dispose the vehicle-mounting surface 15 at an adequate distance wherever possible, it is preferred that the upper enclosure reference surface 21 be provided in addition to the vehicle-mounting surface 15 which comes into contact with the vehicle, as shown in FIG. 2A.

In the above instance, it is most appropriate that the two upper enclosure reference surfaces 21 be parallel and flush with each other. Even if they cannot easily be flush with each other, the same advantage can be obtained as long as they are parallel to each other.

As shown in FIG. 2B, when the upper enclosure reference surface 21 and the enclosure reference surface 13 are to be provided, they may be integrated and provided as the front enclosure reference surface 22. This makes it possible to reduce the installation space for the enclosure reference surface and decrease the size of a stereo camera enclosure when it is mounted on the vehicle.

As shown in FIG. 3, the lateral enclosure reference surface 31 may be disposed in the front and in the rear. In the present embodiment, one of the two lateral enclosure reference surfaces 31 is disposed on the lateral side of one of the two vehicle-mounting surfaces 15 that are positioned at the front, and the other lateral enclosure reference surface 31 is disposed on the lateral side of one of two reference holes 14 that are positioned at the back. Alternatively, however, either one of the two lateral enclosure reference surfaces 31 may be omitted. An alternative for example is to dispose only one lateral enclosure reference surface 31 on the lateral side of one of the two reference holes 14 that are positioned at the back.

Third Embodiment

A third embodiment of the present invention will now be described with reference to an exemplary structure in which an enclosure reference hole 41 is provided instead of the enclosure reference surface 13.

Elements that perform the same functions and are designated by the same reference numerals as the elements shown in FIG. 1 will not be redundantly described.

Figure 4:
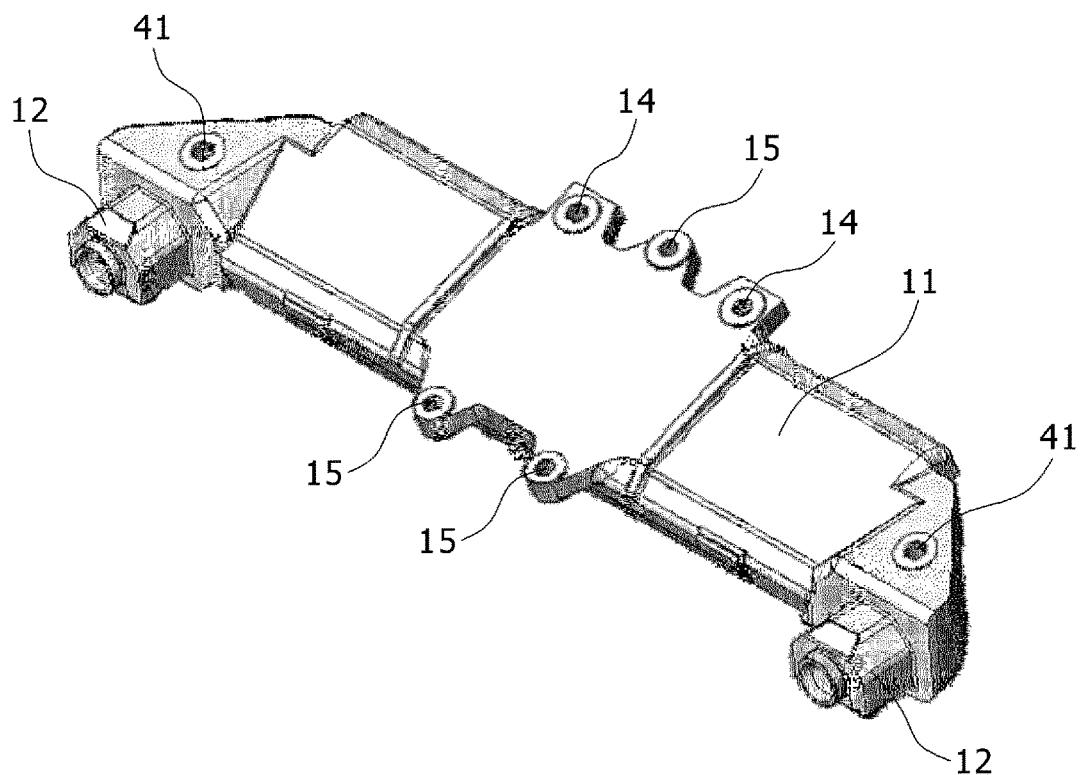
FIG. 4 is a diagram illustrating an exemplary enclosure structure of the on-vehicle image processing device according to a third embodiment of the present invention.

FIG. 4 shows an example in which the enclosure reference hole 41, instead of the enclosure reference surface 13 and the lateral enclosure reference surface, is disposed on the side of the vehicle-mounting surface 15 of the imaging sections 12, the enclosure reference hole 41 serving as an enclosure reference surface.

Being positioned with relation to the equipment jig, two enclosure reference holes 41 should preferably be provided as shown in FIG. 4. Further, the enclosure reference holes 41 may be both shaped as either a perfect circle or an oval. However, as a pin to be inserted is used as the equipment jig, it is preferred, from the viewpoint of engagement, that one enclosure reference hole 41 be shaped as a perfect circle while the other be shaped as an oval.

The enclosure reference hole 41 may be disposed on the enclosure 11 instead of the imaging sections 12. In this case, too, it is preferred that the two enclosure reference holes 41 be positioned at the maximum possible distance from each other.

Moreover, the enclosure reference hole 41 may be formed integrally with the upper enclosure reference surface 21. This makes it possible to achieve positioning in the front-rear direction, up-down direction, and left-right direction.

The present invention is not limited to the foregoing embodiments but may be variously modified. The foregoing embodiments have been described in detail to facilitate the understanding of the present invention. The present invention is not necessarily limited to a configuration having all the above-described elements.

Some of the elements included in a certain embodiment may be replaced by the elements of another embodiment. Further, the elements included in a certain embodiment may be added to the elements included in another embodiment.

Furthermore, some elements of each embodiment may be subjected to the addition of other elements, deleted, or replaced by other elements.

DESCRIPTION OF REFERENCE NUMERALS

11 . . . Enclosure
12 . . . Imaging section
13 . . . Enclosure reference surface
14 . . . Reference hole
15 . . . Vehicle-mounting surface
21 . . . Upper enclosure reference surface
22 . . . Front enclosure reference surface
31 . . . Lateral enclosure reference surface
41 . . . Enclosure reference hole

The invention claimed is:

1. A stereo vision system for vehicle comprising:
   a first imaging section;
   a second imaging section;
   an enclosure having the first imaging section arranged at one end and the second imaging section arranged at another end thereof;
   a first cut or ground surface;
   a second cut or ground surface; and
   a first projection being positioned around the first imaging section;
   a second projection being positioned around the first imaging section;
   wherein the first projection and the second projection project from the enclosure and form a vehicle-mounting surface;
   wherein the first cut or ground surface is located on the first projection; and
   wherein the second cut or ground surface is located on the second projection: and
   wherein a distance between the first cut or ground surface and the second cut or ground surface is longer than a distance between the first imaging section and the second imaging section.

2. The stereo vision system according to claim 1,
   wherein the first cut or ground surface and the second cut or ground surface are exposed in a state in which the stereo vision system is assembled.

3. The stereo vision system according to claim 2,
   wherein the first projection and the second projection project are exposed in a state in which the stereo vision system is assembled.

4. The stereo vision system according to claim 1,
   wherein the first cut or ground surface is located on a first side of the first projection; and
   wherein the second cut or ground surface is located on a second side of the second projection.

5. The stereo vision system according to claim 2,
   wherein the first side of the first projection is a surface other than a surface positioned on a projecting direction of the first projection; and
   wherein the second side of the second projection is a surface other than a surface positioned on projecting direction of the second projection.

6. The stereo vision system according to claim 5,
   wherein the first cut or ground surface is cut; and
   wherein the second cut or ground surface is cut.

7. The stereo vision system according to claim 1,
   wherein the first cut or ground surface is cut; and
   wherein the second cut or ground surface is cut.

8. The stereo vision system according to claim 1,
   wherein the first projection and the second projection project in a state in which the stereo vision system is assembled.

* * * * *